(12) United States Patent
Sakonjo et al.

(10) Patent No.: US 7,114,319 B2
(45) Date of Patent: Oct. 3, 2006

(54) UNIDIRECTIONAL LONG FIBER THREE DIMENSIONAL FIBER STRUCTURE PRODUCED BY SHORT FIBER INTERTWINING AND PRODUCTION METHOD THEREOF

(75) Inventors: Hideki Sakonjo, Osaka (JP); Masayasu Ishibashi, Osaka (JP); Tetsuro Hirokawa, Osaka (JP); Takeshi Tanamura, Osaka (JP); Koichi Hashimoto, Osaka (JP)

(73) Assignee: Shikibo Ltd., Osaka-Fu (JP)

( * ) Notice: Subject to any disclaimer, the term of this patent is extended or adjusted under 35 U.S.C. 154(b) by 169 days.

(21) Appl. No.: 10/407,865

(22) Filed: Apr. 4, 2003

(65) Prior Publication Data
US 2003/0194528 A1    Oct. 16, 2003

(30) Foreign Application Priority Data
Apr. 10, 2002   (JP)   ............................. 2002-107532

(51) Int. Cl.
*D02G 3/02*   (2006.01)

(52) U.S. Cl. .......................................... 57/200; 57/311

(58) Field of Classification Search ................. 57/210, 57/1 R, 200, 311; 28/103, 107, 217, 299
See application file for complete search history.

(56) References Cited

U.S. PATENT DOCUMENTS

| | | | | |
|---|---|---|---|---|
| 4,445,318 A | * | 5/1984 | Becker et al. ................. | 57/22 |
| 4,674,271 A | * | 6/1987 | Bird ................................ | 57/2 |
| 5,114,769 A | | 5/1992 | Kani et al. ..................... | 428/37 |
| 5,503,928 A | * | 4/1996 | Cheshire ...................... | 428/357 |
| 5,721,036 A | | 2/1998 | Tingley ......................... | 428/96 |
| 5,910,458 A | | 6/1999 | Beer et al. ................... | 442/367 |
| 6,311,375 B1 | * | 11/2001 | Patrick ......................... | 28/253 |
| 6,796,115 B1 | * | 9/2004 | Patrick ......................... | 57/210 |
| 6,857,170 B1 | * | 2/2005 | Fehrer .......................... | 28/107 |
| 2002/0038499 A1 | * | 4/2002 | Fehrer .......................... | 28/219 |

FOREIGN PATENT DOCUMENTS

| | | |
|---|---|---|
| EP | 1 145 841 | 10/2001 |
| FR | 2 811 688 | 7/2000 |

\* cited by examiner

*Primary Examiner*—Shaun R. Hurley
(74) *Attorney, Agent, or Firm*—J.C. Patents

(57) ABSTRACT

A unidirectional three dimensional fiber structure is provided which does not require weaving, displays a high level of interlayer strength and does not suffer from cracking, and which can also be easily produced with any arbitrary cross-section. A unidirectional three dimensional fiber structure is produced by inserting a plurality of long fibers which have been aligned unidirectionally into an inlet at one end of a cylindrical die with a plurality of needle holes in the peripheral walls thereof, and then performing needlepunch through the needle holes while drawing the plurality of long fibers out from an outlet at the opposite end of the cylindrical die.

3 Claims, 11 Drawing Sheets

UNIDIRECTIONAL LONG FIBER THREE DIMENSIONAL FIBER STRUCTURE PRODUCED BY SHORT FIBER INTERTWINING AND PRODUCTION METHOD THEREOF

BACKGROUND OF THE INVENTION

1. Field of the Invention

The present invention relates to a unidirectional long fiber three dimensional fiber structure suitable for use as a fiber reinforced material formed complicated shape preform for a composite material used in aircraft and spacecraft structures, ships, and vehicles and the like, as well as a method of producing such a structure.

2. Description of the Related Art

Methods of producing unidirectional three dimensional fiber structures include methods in which long fibers are immersed in a resin and then subjected to drawing, and methods in which prepregs, formed by impregnating fibers with a resin and then semi curing the impregnated fibers, are laminated together. However, both of these methods require the use of a resin as a forming. If a resin is used, then the production process and production time frame is restricted by the need to manage the life of the resin being used, meaning handling of the resin material is rather difficult.

Needlepunch of layered fibers in a single dimension is also a possibility, although presently no consideration is given to intertwine the interface between fibers in a three dimensional manner, and consequently various problems arise such as cracking of the fiber structure following matrix impregnation, and an inability to achieve sufficient interlayer strength even after molding, meaning a good fiber reinforced preform cannot be obtained. These problems cannot be resolved with the inventions disclosed in Japanese Patent Publication No. Hei 6-39743, Japanese Patent Publication No. Hei 7-59783, or Japanese Patent Laid-Open Publication No. Hei 09-004661. Furthermore, as shown in the apparatus of Japanese Patent Laid-Open Publication No. Hei 11-050371, another possible method involves laying or winding a plurality of layers of woven members, tape members or braided members, and then using needlepunch to integrate the layers into a single unit, but even this method does not aim to intertwine the interface between fibers in a three dimensional manner, and because a weaving step is included before the preform is obtained, shortening the preparation time is problematic.

Furthermore, in a three dimensional fiber structure in which the fibers have been aligned unidirectionally without needlepunch, the fiber density is very high and the space between fibers is extremely narrow. Consequently when an attempt is made to impregnate the structure with a resin, the matrix impregnation is extremely poor, meaning long periods of time are required to ensure an adequate level of impregnation.

In addition, in the case of the production of a carbon-carbon composite in which the fibers are aligned unidirectionally, delamination can occur between carbon fibers during the baking process, causing cracks to appear in the product, and preventing a superior product from being obtained.

BRIEF SUMMARY OF THE INVENTION

The present invention has an object of resolving the problems outlined above.

In order to resolve the above problems, a first aspect of the present invention provides a unidirectional long fiber three dimensional fiber structure of an arbitrary cross-section, formed by intertwining and integrating a plurality of unidirectionally aligned long fibers using nap-like fibers generated from the long fibers.

Furthermore, according to a second aspect of the present invention, a unidirectional long fiber three dimensional fiber structure according to the first aspect is configured such that fiber irregularities on the surface of the fiber structure are leveled and smoothed out from a plurality of directions using three dimensional multiaxial needlepunch, thereby eliminating any resin accumulation following matrix treatment.

In addition, according to a third aspect of the present invention, a unidirectional long fiber three dimensional fiber structure according to the first aspect is one with an arbitrary annular cross-section, formed by intertwining and integrating in a three dimensional manner a structure of a predetermined thickness and radius, formed by winding a long fiber unidirectionally, using nap-like fibers generated from the long fiber.

Furthermore, according to a fourth aspect of the present invention, a unidirectional long fiber three dimensional fiber structure according to the first aspect is a filler with a predetermined cross-section required by another fiber structure, formed by intertwining and integrating a plurality of long fibers which have been drawn into a unidirectional alignment, using nap-like fibers generated by needlepunch In addition, a fifth aspect of the present invention provides a method of producing a unidirectional long fiber three dimensional fiber structure with the arbitrary annular cross-section according to the third aspect, including the steps of winding the long fiber unidirectionally to form the structure of the predetermined thickness and radius, and performing needlepunch.

Furthermore, a sixth aspect of the present invention provides a method of producing a unidirectional long fiber three dimensional fiber structure according to the fourth aspect, including the steps of drawing the plurality of long fibers into the unidirectional alignment, inserting the long fibers into an inlet at one end of a die provided with a channel of a cylindrical shape or another predetermined cross-sectional shape with needle holes in the peripheral walls thereof, and performing needlepunch through the needle holes while drawing the plurality of long fibers from an outlet at the opposite end of the die provided with the channel of a cylindrical shape or another predetermined cross-sectional shape.

In addition, a seventh aspect of the present invention provides a method of producing a unidirectional long fiber three dimensional fiber structure according to the fourth aspect, wherein in order to increase the convergence between the long fibers when the plurality of long fibers which have been drawn into the unidirectional alignment are intertwined and integrated using the nap-like fibers generated by needlepunch, a second long fiber is wound in a helical shape around the plurality of long fibers prior to the needlepunch step.

A unidirectional three dimensional fiber structure according to the present invention may have either a solid or a hollow cross-sectional shape, although for application as a filler for embedding within a cavity within another fiber structure, a fiber structure with a solid cross-section which matches the cross-sectional shape of the cavity is used.

DETAILED DESCRIPTION OF THE INVENTION

Figure 1A:
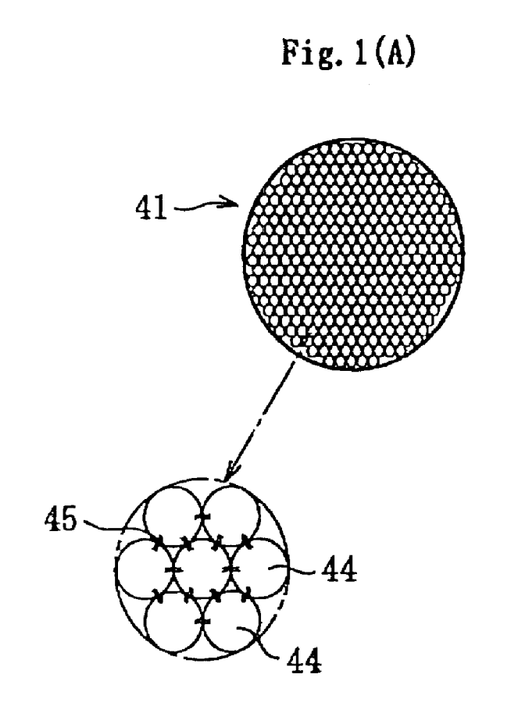
FIG. 1(A) to FIG. 1(C) are cross-sectional views of three dimensional fiber structures.
Figures 1B, 1C:
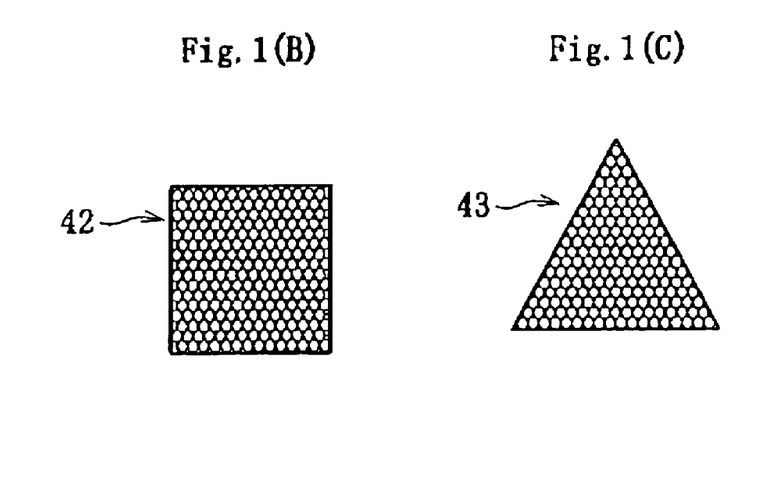
Figure 1D:
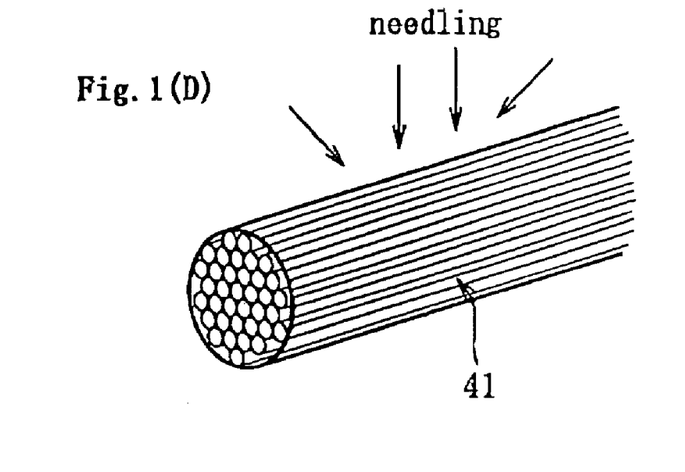
FIG. 1(D) is a perspective view showing needlepunch of the three dimensional fiber structure of FIG. 1(A).

As follows is a description of preferred embodiments of the present invention, based on the drawings. FIG. 1(A) through FIG. 1(C) are sample cross-sections of unidirectional three dimensional fiber structures 41, 42, and 43 of the present invention, showing circular, square, and triangular cross-sections, respectively. In addition to these shapes, the present invention can also be applied to any other arbitrary cross-sectional shape, including polygons of 5 or more sides, ellipses, star shapes, H shapes, I shapes, Y shapes and other irregular shapes. The unidirectional three dimensional fiber structure is produced by performing needlepunch from a plurality of directions, as shown in the unidirectional three dimensional fiber structure 41 of circular cross-section shown in FIG. 1(D). By conducting needlepunch in this manner, the individual long fibers 44 are intertwined and integrated by nap-like fibers 45 which extend in a plurality of directions, as shown in the enlarged view of FIG. 1(A).

The unidirectional three dimensional fiber structure 41 can be produced, for example, using a cylindrical die 47 in which a straight aperture 46 has been opened, as shown in FIG. 2. This aperture 46 within the die 47 is preferably a tapered aperture in which the internal diameter narrows gradually from an inlet 46a at one end of the aperture through to an outlet 46b at the other end, as shown in FIG. 2(B). By employing such a construction, the insertion of the long fibers 44 can be achieved smoothly, while the density of the long fibers 44 at the outlet can be increased.

Figure 2A:
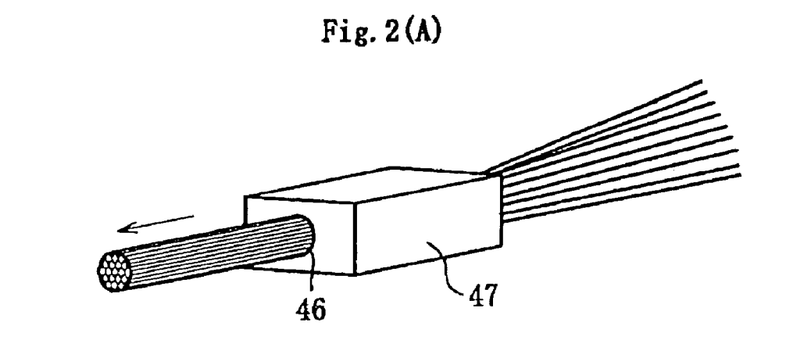
FIG. 2(A) is a perspective view of a die for producing a three dimensional fiber structure.
Figure 2B:
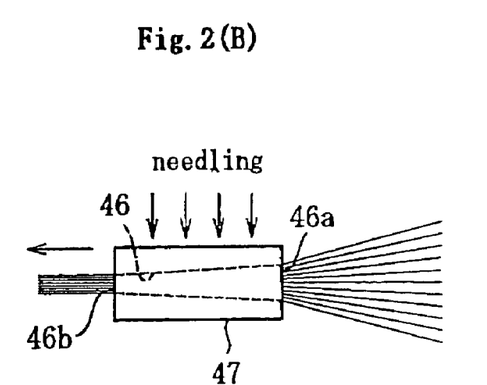
FIG. 2(B) is a side view of the same die.
Figure 2C:
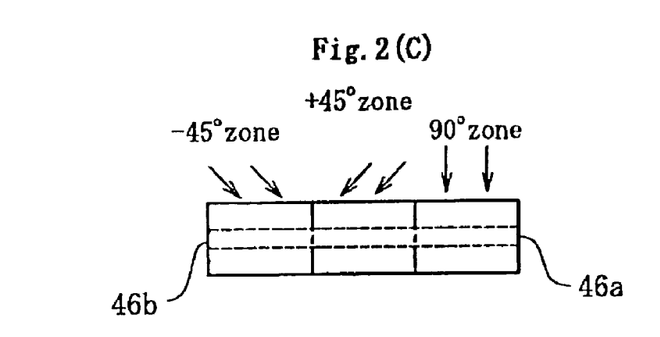
FIG. 2(C) is a side view of the die showing the needlepunch directions.
Figure 2D:
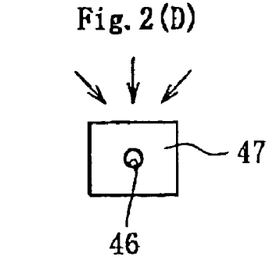
FIG. 2(D) is a front view of the die.
Figure 2E:
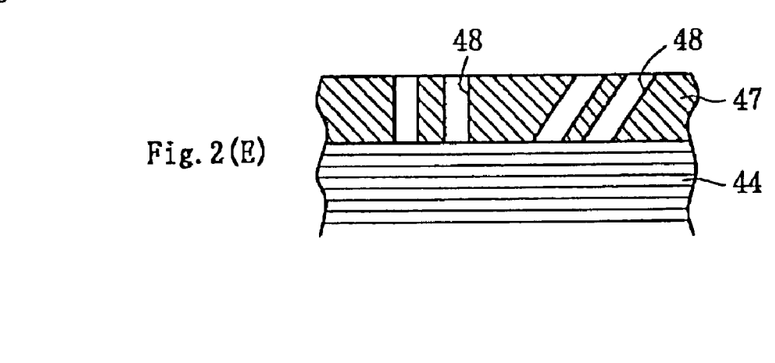
FIG. 2(E) is a partially enlarged sectional view of the die.

A plurality of needle holes 48 are formed which extend through the side wall of the die 47 and into the aperture 46, and three dimensional multiaxial needlepunch of the long fibers 44 inside the die 47 is conducted through these needle holes 48. As shown in FIG. 2(C), a 90° zone, a +45° zone and a −45° zone can be arranged sequentially along the length of the aperture 46, starting at the inlet side 46a, and needlepunch is then performed at an angle of 90°, +45° and −45° respectively within each of these zones. In addition, as shown in FIG. 2(D), needlepunch is also performed from, for example, three different angles around the periphery of the aperture 46. According to this type of construction, nap-like fibers 45 are forced out in a plurality of directions from each long fiber 44, and these nap-like fibers 45 become intertwined with the nap-like fibers 45 from other long fibers 44, thereby binding the plurality of long fibers 44 into a single integrated unit, as shown in FIG. 1(A).

In cases in which a thick bundle is used in an attempt to reduce production costs, a large amount of surface roughness is usually generated, but the surface of a unidirectional three dimensional fiber structure obtained by the method described above is basically smooth, with the long fibers 44 aligned in a regular manner. As a result, resin accumulation following matrix impregnation treatment can be effectively eliminated.

Figure 3A:
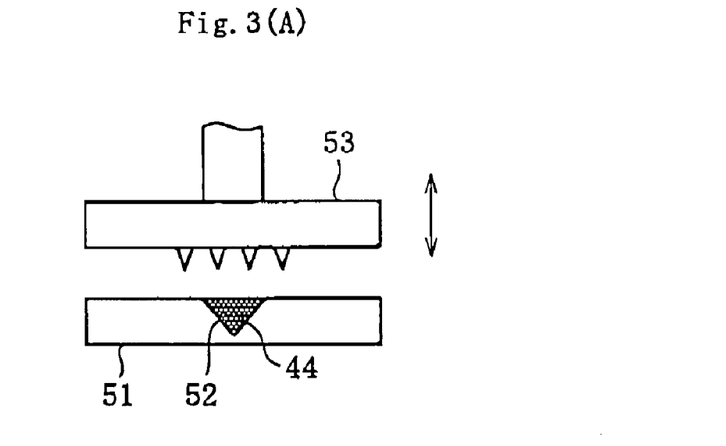
FIG. 3(A) is a cross-sectional view of a die plate.
Figure 3B:
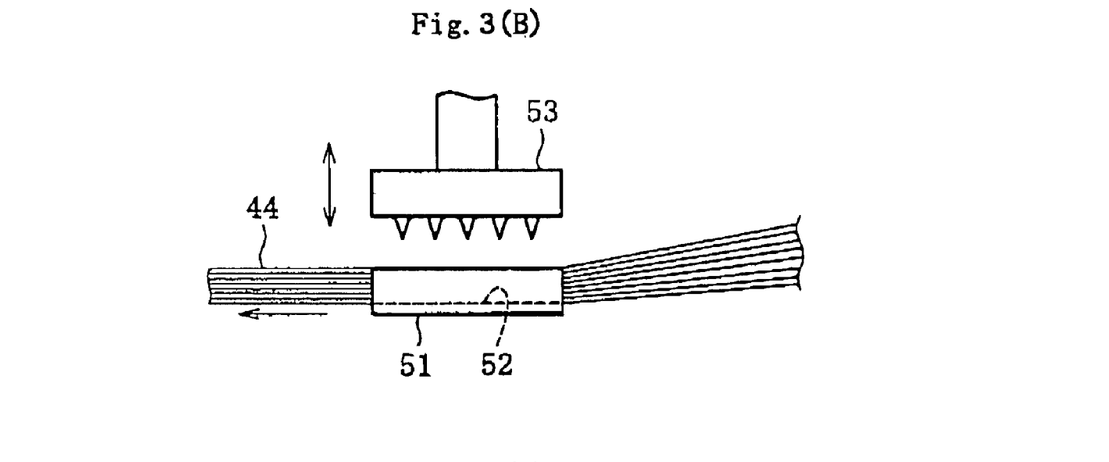
FIG. 3(B) is a side view of a die plate.
Figure 3C:
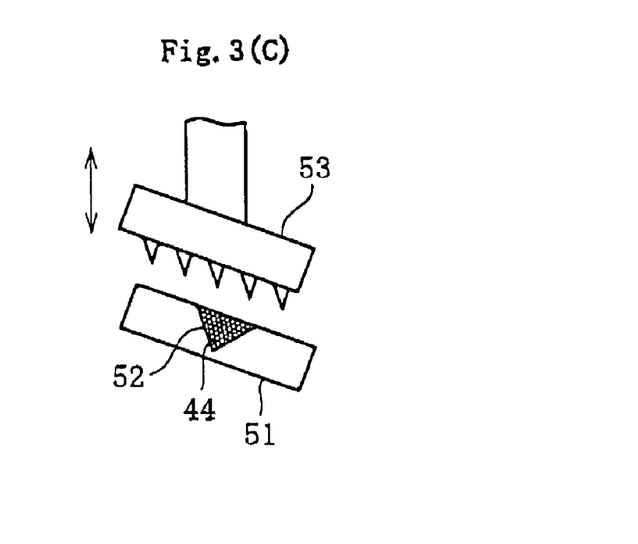
FIG. 3(C) is a front view of a die plate.

The die used in the production of a unidirectional three dimensional fiber structure is not restricted to a circular cylindrical shape. As shown in FIG. 3, a unidirectional three dimensional fiber structure can also be produced using a plate type die 51. A channel 52 with, for example, a V shaped cross-section which extends linearly along the die is formed in the surface of the die 51, and a plurality of long fibers 44 that have been drawn into alignment are inserted from an inlet at one end of the channel 52, and the leading ends of the long fibers 44 are then pulled through from the outlet at the other end of the channel 52. During this process, a needlepunch head 53 is moved up and down to perform needlepunch of the long fibers 44 inside the channel 52, as shown in FIG. 3(A) to FIG. 3(C), thereby intertwining and integrating the long fibers 44 inside the channel 52 through the action of the nap-like fibers generated by the needlepunch. By altering the needlepunch angle relative to the channel 52 as shown in FIG. 3(C), three dimensional multiaxial needlepunch can be achieved. As a result, a unidirectional three dimensional fiber structure with a triangular cross-section such as that shown in FIG. 1(C) can be produced. Of course, by altering the cross-sectional shape of the channel 52 to a different shape such as a U shape or a rectangular shape, a unidirectional three dimensional fiber structure of any arbitrary cross-section can be produced.

Figure 4:
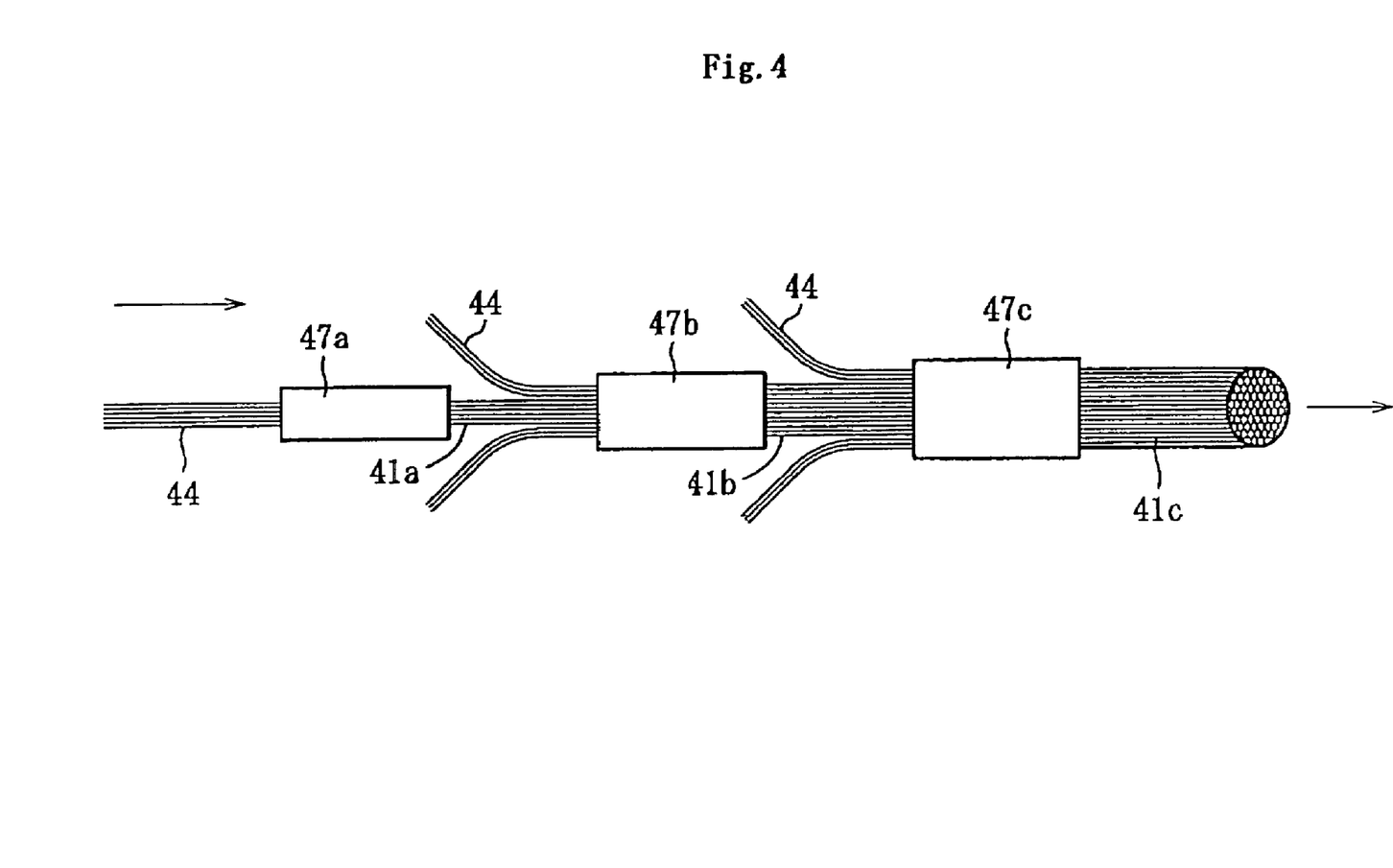
FIG. 4 is a side view of a plurality of dies, showing a modification of a method of producing a three dimensional fiber structure.
Figure 5A:
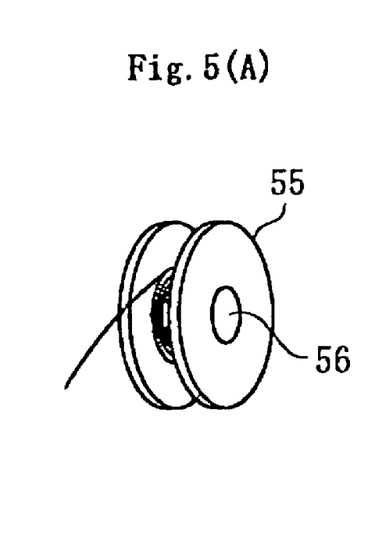
FIG. 5(A) is a perspective view of a die for producing a ring shaped fiber structure.
Figure 5B:
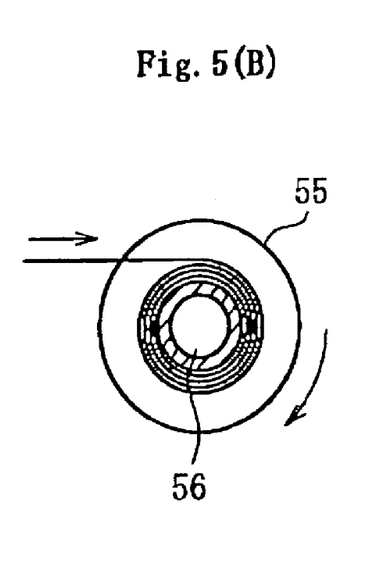
FIG. 5(B) is a cross-sectional view of the die in a direction perpendicular to central axis of the die.
Figure 5C:
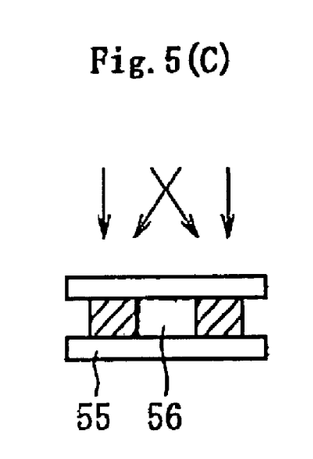
FIG. 5(C) is a cross-sectional view of the die in a direction parallel to central axis of the die.
Figure 5D:
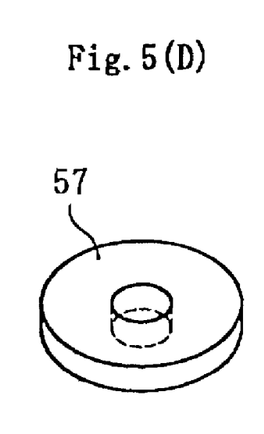
FIG. 5(D) is a perspective view of a disc shaped fiber structure.

In cases in which a solid or hollow fiber structure with a large thickness or diameter, including long fibers aligned unidirectionally along the lengthwise direction of the structure, is required, then as shown in FIG. 4, a comparatively narrow solid or hollow long-fibers 44 of a thickness or diameter which enables needlepunch to be performed through to the center of the structure is first drawn through a first die 47*a* in a similar manner to the method shown in FIG. 2. The drawn solid fiber structure 41*a* is then passed consecutively through a second die 47*b* and a third die 47*c* arranged in series after the first die 47*a*. Within each die, the outer periphery of the fiber structure 41*a* and 41*b* are covered with a plurality of long fibers 44, that have been drawn into alignment unidirectionally along the lengthwise direction of the structure, to a thickness which is able to be subjected to needlepunch. Three dimensional multiaxial needlepunch is then performed through needle holes formed in each die, while the central fiber structure and the outer periphery covering fiber structure are drawn out from the outlets of the second and third dies 47*b*, 47*c* as a single integrated unit. The first, second and third dies 47*a*, 47*b*, and 47*c* are formed with sequentially increasing internal diameters of the apertures within the dies, in accordance with the number or thickness of the covering long fibers added at the inlet of each die. In this manner, by repeating the process of forming an outer periphery covering using a plurality of long fibers 44 over a number of stages, a solid three dimensional fiber structure 41*b* or 41*c* of good thickness and with the long fibers aligned unidirectionally along the lengthwise direction of the structure can be produced.

Figure 6A:
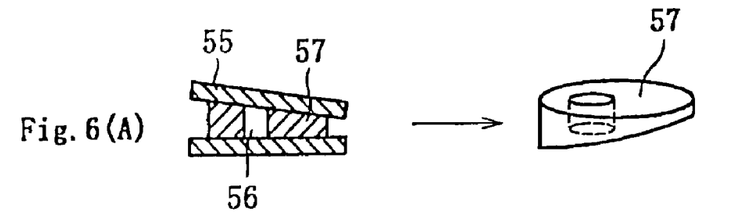
FIG. 6(A) to FIG. 6(C) are side views showing dies for producing disc shaped fiber structures, and products produced using the dies.
Figure 6B:
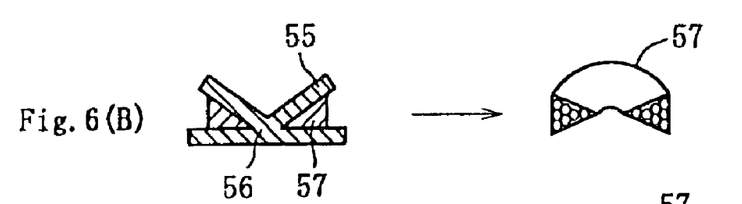
Figure 6C:
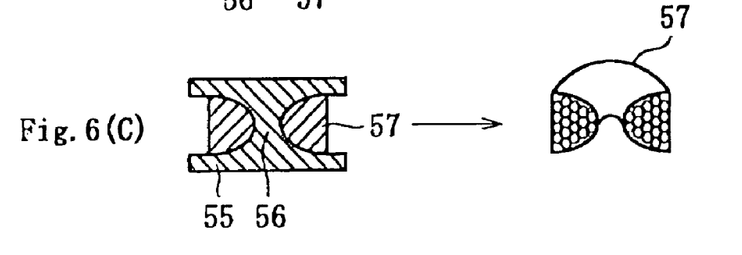
Figure 6D:
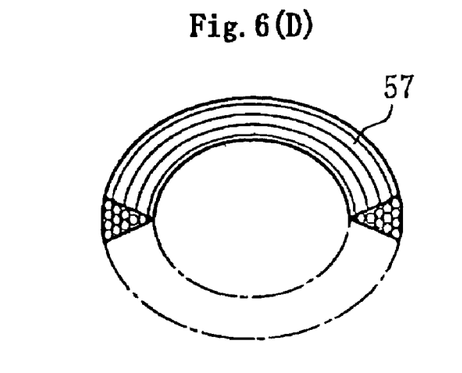
FIG. 6(D) is a partial perspective view of a disc shaped fiber structure.
Figure 6E:
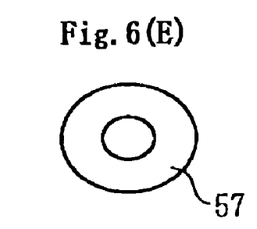
FIG. 6(E) and FIG. 6(F) are plan views of disc shaped fiber structures.
Figure 6F:
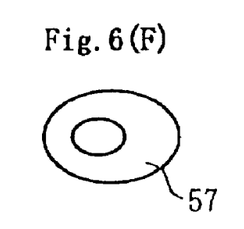
Figure 6G:
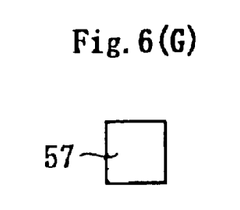
FIG. 6(G) to FIG. 6(J) are cross-sectional views of the core sections of ring shaped fiber structures.
Figure 6H:
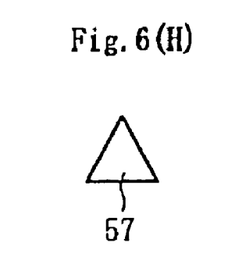
Figure 6I:
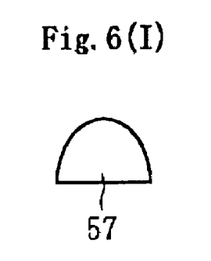
Figure 6J:
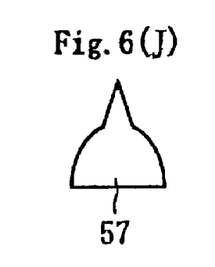

The above description outlined unidirectional three dimensional fiber structures which extended linearly, but as follows is a description of unidirectional three dimensional fiber structures which extend in a circumferential direction with an arbitrary annular cross-section. This type of fiber structure can be produced using a method shown in FIG. 5, for example. In this production method, a long fiber 44 is wound around a mandrel 56 having a lift and right pair of circular plate type flanges 55 fixed to each end, and when a predetermined thickness and radius have been reached, the winding is stopped, and needlepunch is then performed at a predetermined density through a plurality of needle holes formed in the flanges 55. As a result, a unidirectional three dimensional fiber structure 57 with an arbitrary annular cross-section such as a circular disc shape, a circular cylindrical shape, or a ring shape can be produced. As shown in FIG. 6(A) through FIG. 6(C), a variety of cross-sectional shapes are possible. FIG. 6(D) shows a donut shaped unidirectional three-dimensional fiber structure 57 in which the cross-section of the annular body is a triangular shape. By altering the angle and the shape of the flanges 55 fixed to the mandrel 56, fiber structures 57 with a variety of different cross-sectional shapes can be produced. For example, if as shown in FIG. 6(A), the angle of a flange 55 is altered so that when viewed from a radial direction one side of the flange sits higher than the other, then a tapered eccentric circular shaped three dimensional structure 57 can be formed, and by altering the shape of the bobbin or mandrel 56, annular fiber structures 57 with any arbitrary cross-sectional shape, including semicircles, triangles, oblate semicircles or combinations of these shapes can be achieved. For example, by positioning the center of the mandrel 56 eccentrically, and altering the angle of opening between the flanges 55, the wind radius of the long fiber 44 can be lengthened or shortened, meaning that not only fiber structures 57 of uniform radius such as that shown in FIG. 6(E), but also fiber structures 57 such as that shown in FIG. 6(F), with an elliptical shape in a plan view, can be produced. Examples of possible cross-sections are shown in FIG. 6(G) through FIG. 6(J).

This type of annular fiber structure 57 is ideal for use as a typical brake material or packing material, and can also be applied to many other applications by altering the shape or the variety of the long fiber. Furthermore, fiber structures of oblate circular shape, oblate semicircular shape or triangular shape or the like can also be used as fillers by matching the shape of the fiber structure to that of a cavity within another fiber structure.

Three dimensional fiber structures in which long fibers have been aligned unidirectionally are prone to high fiber densities, and in some examples impregnation of resin does not progress satisfactorily. However, by conducting needlepunch, a high density fiber structure with a level of fiber strength suitable for the particular application can be formed, and the exterior surface area of each long fiber is increased considerably by the nap-like fibers generated through needlepunch, meaning the level of impregnation of a matrix resin can be improved markedly. Needlepunch for this particular purpose has conventionally not been used in the field of three dimensional fiber structures.

Moreover, in the production of carbon-carbon composites in which long fibers are aligned unidirectionally, cracking between the long fibers has been a problem. However, by conducting needlepunch, the long fibers can be intertwined in a three dimensional manner via the nap-like fibers generated from the long fibers. Experiments by the inventors of the present invention confirmed that superior three dimensional fiber structures in which the long fibers are aligned unidirectionally, of a quality which has been unobtainable by conventional techniques, can be produced easily and cheaply using the present invention.

Figure 7:
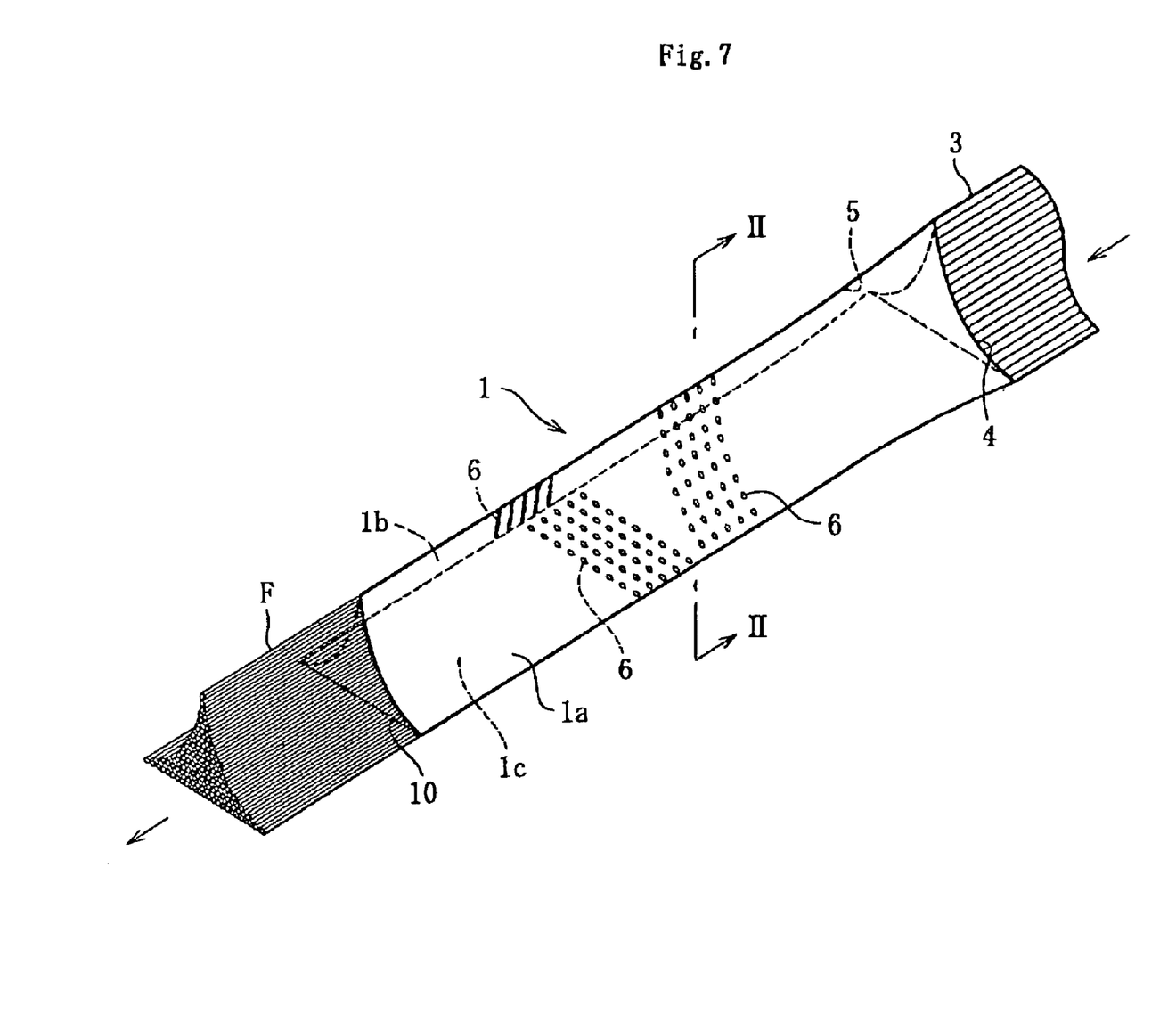
FIG. 7 is a perspective view of a fiber structure according to an embodiment of the present invention and a production apparatus for producing the fiber structure.
Figure 8:
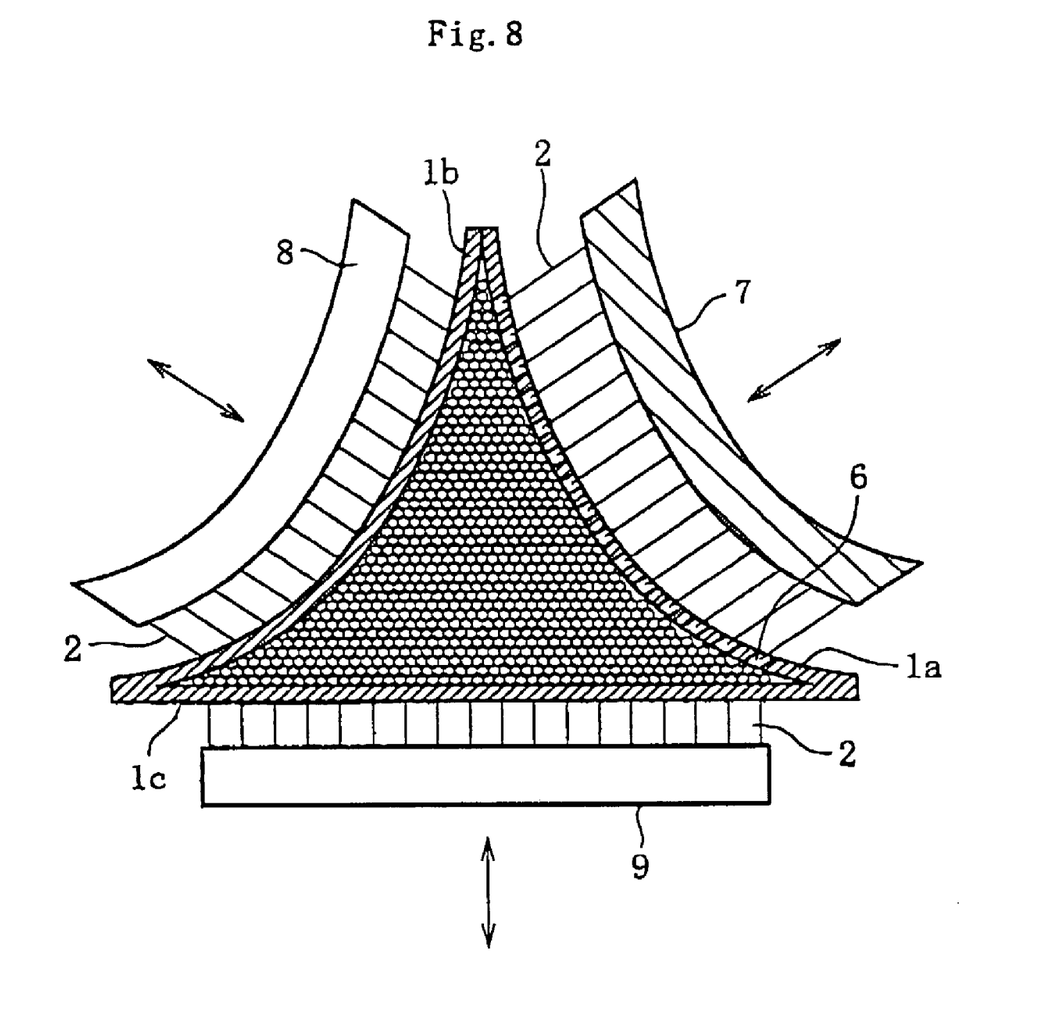
FIG. 8 is a cross-sectional view viewed along the arrowed line II—II in FIG. 7.
Figure 12:
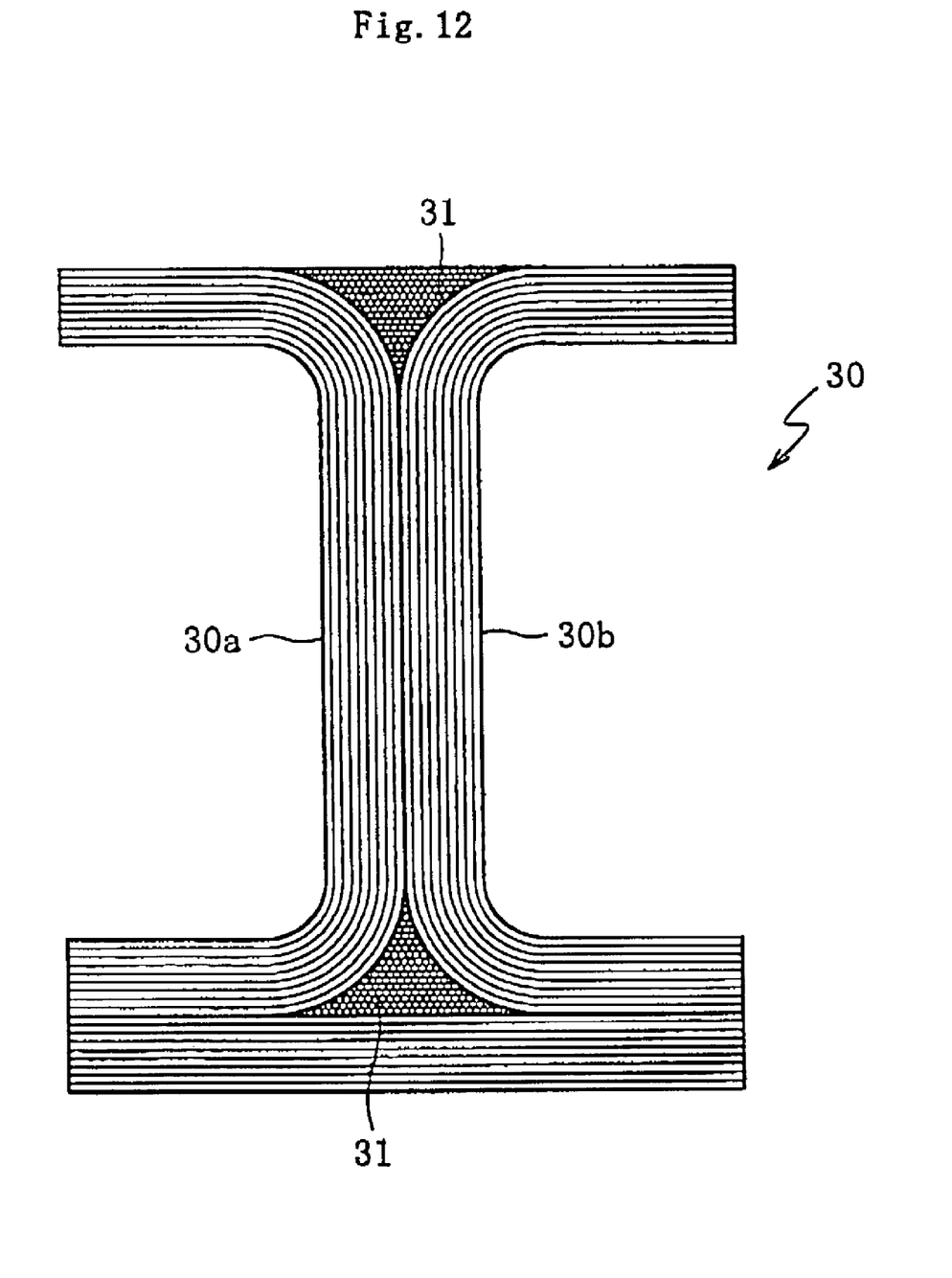
FIG. 12 is a cross-sectional view of a main fiber structure with a filler.

Next is a description of a production example of a unidirectional three dimensional fiber structure with a triangular cross-section. As shown in FIG. 7 and FIG. 8, the apparatus used for producing this three dimensional fiber structure with a triangular cross-section includes a triangular cylindrical die 1 and a plurality of needles 2. Specifically, the die 1 has a left and right pair of symmetrical side wall plates 1*a* and 1*b* which are gently curved, and a flat bottom wall plate 1*c*. The curvature of the side wail plates 1*a* and 1*b* in the case in which the fiber structure is used as a filler for a notch 31 shown in FIG. 12, is matched to the curvature of the left and right side walls within the notch 31 generated when the two approximately C shaped preforms 30*a* and 30*b* are combined to form a flange shape. An inlet 4 into which a plurality of long fibers 3 is inserted is formed at one end of the die 1 in a lengthwise direction, and the internal surface of the die 1 from this inlet 4 through to a substantially central section of the die 1 in the lengthwise direction is formed as a taper 5 in which the internal dimensions narrow gradually.

A plurality of needle holes 6 for inserting the needles 2 are formed in the side wall plates 1*a* and 1*b* and the bottom wall plate 1*c*. These needle holes 6 are formed in a staggered arrangement so that the holes in each of the wall plates 1*a* to 1*c* do not overlap with those of the other wall plates along the lengthwise direction of the die 1. In the example shown in the figures, the needle holes 6 in the side wall plate 1*a* are formed closest to the inlet 4, with the needle holes 6 in the bottom wall plate 1*c* and the side wall plate 1*b* formed sequentially further away from the inlet 4.

Figure 9:
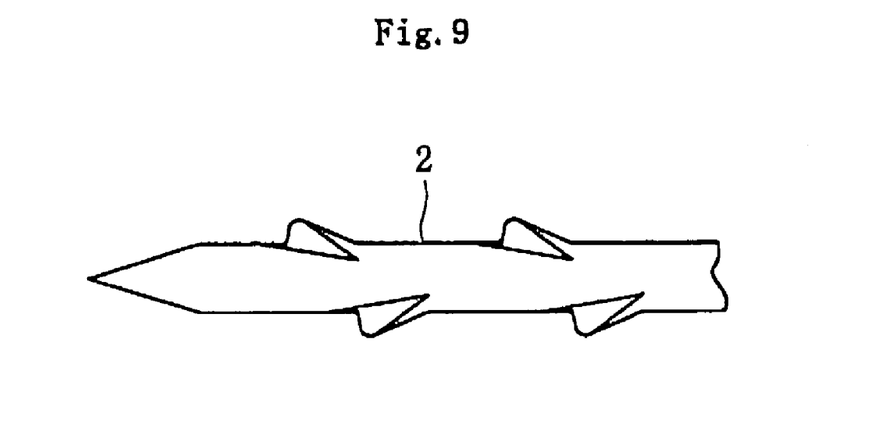
FIG. 9 is a side view of a needle.

As shown in FIG. 8, needle supports 7 to 9 which can be moved in and out are positioned at locations close to the outer surface of each of the wall plates 1*a* to 1*c*, and a plurality of needles 2 protrude from each of these needle supports 7 to 9. By moving each of the needle supports 7 to 9 in and out independently, the tips of the needles 2 are inserted into the die 1 and cause mutual intertwining of the long fibers 3 inside the die 1, thereby binding the plurality of long fibers 3 into a single integrated unit. The needles 2 can utilize normal needles used in the production of needle punched carpet, and needles 2 of the shape shown in FIG. 9 can be used, for example.

Figure 10:
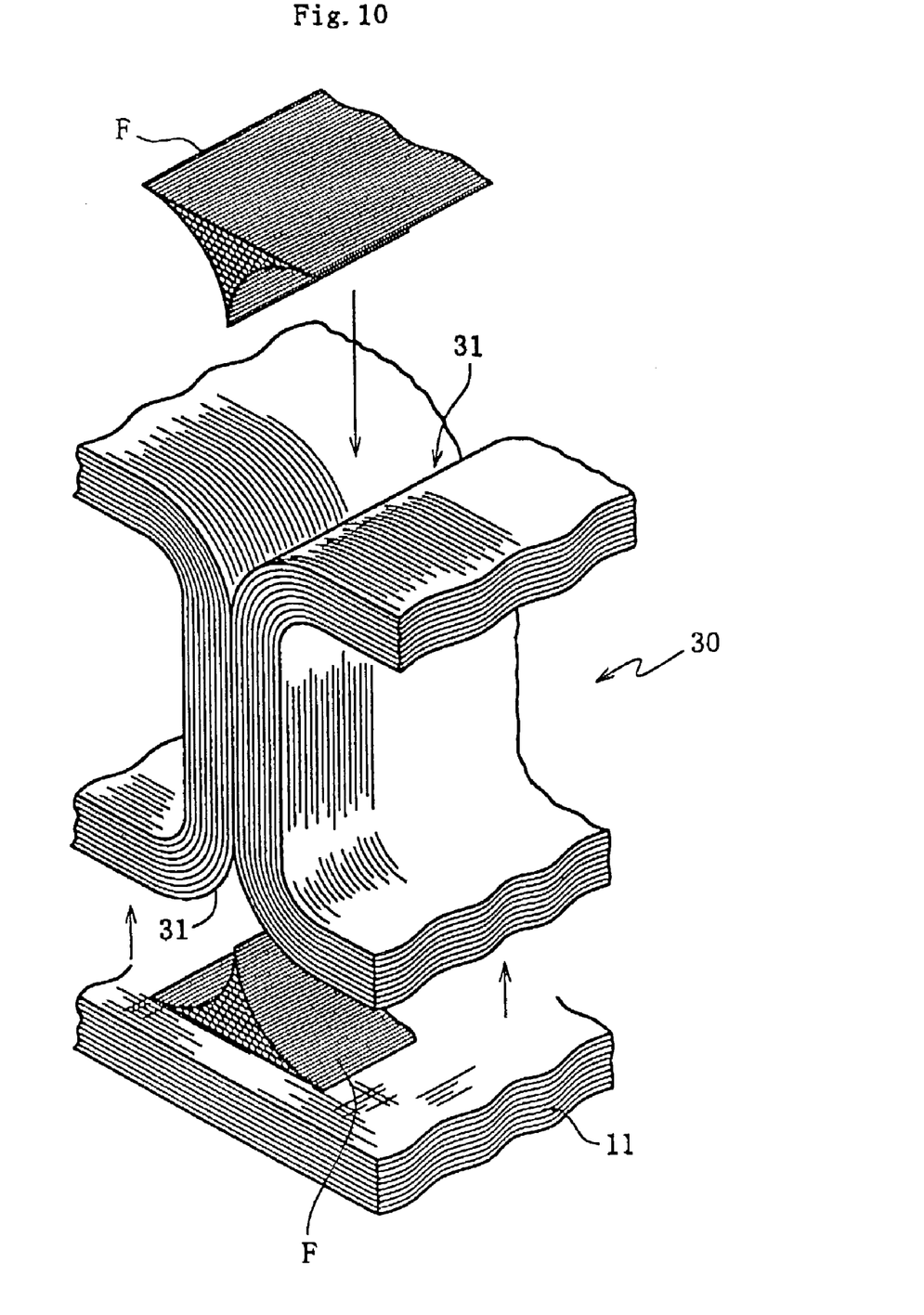
FIG. 10 is a perspective view showing the attachment of a filler to a main fiber structure.
Figure 11:
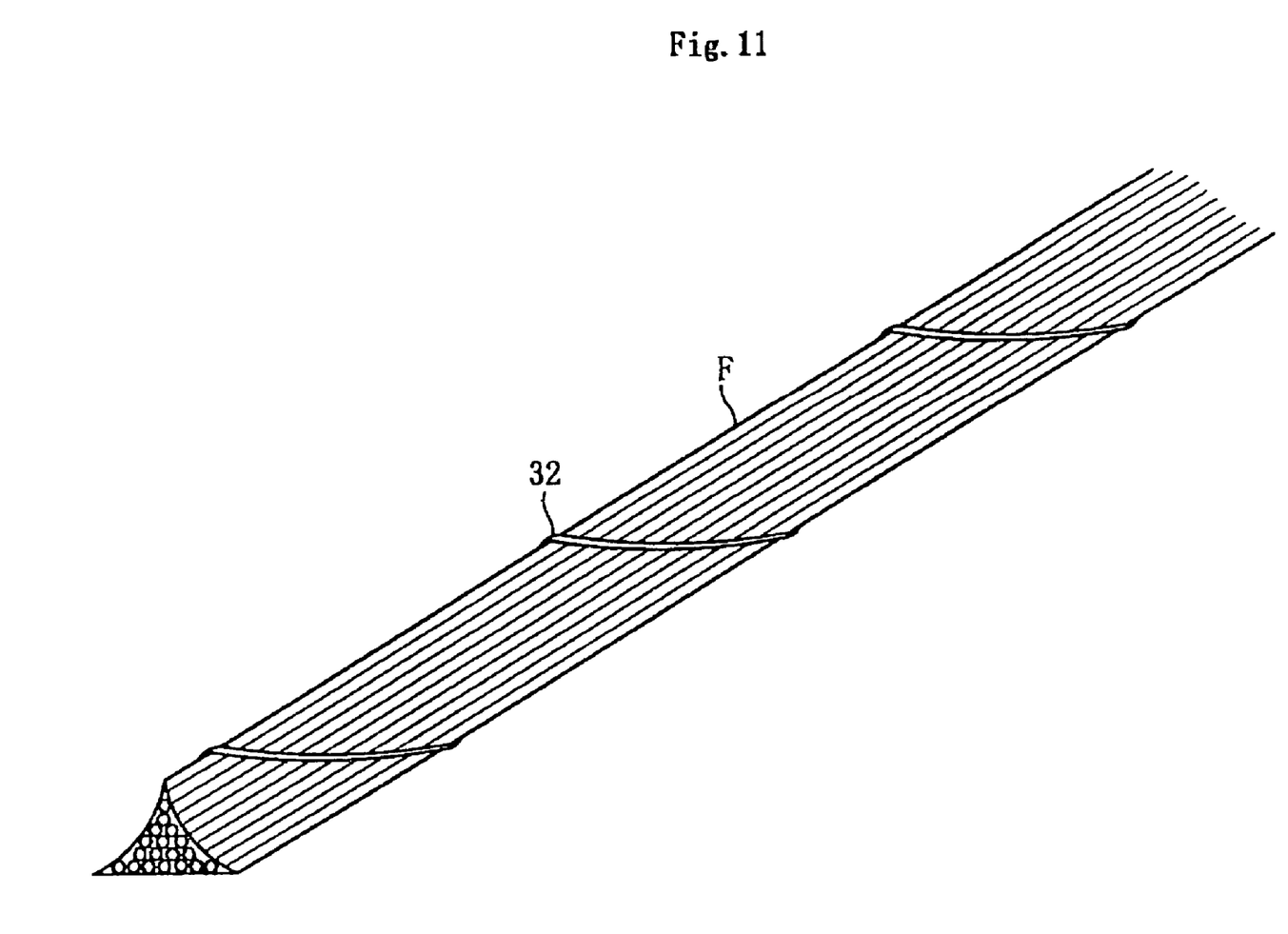
FIG. 11 is a perspective view showing a second long fiber wound in a helical shape.

In order to produce a filler fiber structure shown in FIG. 10 with the apparatus described above, a predetermined number of long fibers 3 are drawn into alignment and inserted into the inlet 4 of the die 1, and the tips of the long fibers 3 are then sandwiched between an appropriate set of rollers and forcibly pulled out from an exit 10 of the die 1. The type of long fibers 3 used can be determined in accordance with the type of fibers used within the main fiber structure and the intended application, and many different fibers are possible, including not only the various organic fibers such as polyester fiber, but also inorganic fibers such as glass fiber, carbon fiber and ceramic fiber, and metallic fibers. Furthermore, among carbon fibers and ceramic fibers, some highly elastic fibers generate very few nap-like fibers on needlepunch, and in some cases integration of the fibers via intertwining is not particularly efficient. In these cases, by winding a second long fiber 32 in a helical shape around the fiber structure F prior to needlepunch, as shown in FIG. 11, the convergence generated within the fiber structure F during needlepunch can be assisted with relative ease. This second long fiber which is wound around the fiber structure F in a helical shape may be either the same type of long fiber used to form the fiber structure F, or a different type of fiber. When a plurality of long fibers 3 in an aligned state are passed through the inside of the die 1, the needle supports 7 to 9 are moved in and out, and the tips of the needles 2 are repeatedly inserted through the needle holes 6 and into the die 1, thereby mutually intertwining the long fibers 3 inside the die 1 and generating a single integrated unit. Then, by the time the long fibers pass the final needle holes 6, an integrated fiber structure F has been formed which extends in a lengthwise direction, with a substantially triangular cross-section which matches the internal shape of the die 1, and this integrated fiber structure F is pulled continuously from the outlet 10 of the die 1.

The fiber structure F produced in this manner is then secured within the notch 31 in the main fiber structure 30 using an adhesive or the like, as shown in FIG. 10. If necessary, a separate plate type fiber structure 11 can also be secured. The plurality of fiber structures which have been integrated into a single unit in this manner are then held together in a predetermined shape under pressure, and placed in a high temperature furnace for molding. Following this molding process, the fiber structure is removed from the furnace, and allowed to cool naturally, thereby completing production of the product. The density of the fiber structure F of the present invention can be adjusted easily, by simply increasing or reducing the number of long fibers used, and consequently the coefficient of thermal expansion or the coefficient of thermal contraction can be easily matched to that of the main fiber structure. As a result, the generation of excessive residual thermal stress during the baking or cooling processes can be effectively prevented.

As described above, since the present invention enables a unidirectional three dimensional fiber structure to be formed from long fibers without weaving, a reduction in costs is possible due to the shortening of the production process. Furthermore by performing needlepunch of the unidirectional three dimensional fiber structure, strong intertwining and integration of the fibers is achieved via nap-like fibers, and when subjecting such a fiber structure formed from long fibers to matrix treatment, followed by molding of the composite material, the nap-like fibers improve the impregnation of the matrix material, help prevent cracking of the composite material during the baking process, and ensure satisfactory interlayer strength for the composite material following molding.

What is claimed is:

1. A method of producing a unidirectional long fiber three dimensional fiber structure, comprising:
   providing a first die with a channel of a predetermined cross section, wherein the cross section of the channel of the first die gradually narrows down from the inlet to the outlet;
   inserting a plurality of unidirectional long fibers into an inlet of the channel of the die, wherein the plurality of unidirectional long fibers is confined and shaped by the channel to form a first three dimensional structure; and
   performing needlepunch to the first three dimensional structure in the channel while drawing the plurality of long fibers from an outlet of the channel of the die, so as to intertwine the plurality of long fibers in a three dimensional manner using nap-like fibers generated by the needlepunch to form a first unidirectional long fiber three dimensional fiber structure.

2. The method of claim 1, wherein the needlepunch is performed in multiple directions around a circumference of the first three dimensional structure.

3. The method of claim 1 further comprising:
   providing a second die with a channel having a cross section larger than the cross section of the channel of the first die;
   drawing a plurality of long fibers and the first unidirectional long fiber three dimensional fiber structure into a unidirectional alignment;
   inserting the unidirectional alignment into an inlet of the channel of the second die, wherein the plurality of unidirectional long fibers is confined and shaped by the channel to form a second three dimensional structure; and
   performing needlepunch to the second three dimensional structure in the channel of the second die while drawing the unidirectional alignment from an outlet of the channel of the second die, so as to intertwine the plurality of long fibers in a three dimensional manner using nap-like fibers generated by the needlepunch to form a second unidirectional long fiber three dimensional fiber structure having a cross section larger than that of the first unidirectional long fiber three dimensional fiber structure.

* * * * *